United States Patent [19]

Van Pelt et al.

[11] 4,430,104
[45] Feb. 7, 1984

[54] MULTI-STAGE COUNTERCURRENT CONCENTRATING SYSTEM AND METHOD AND SEPARATOR

[75] Inventors: Wilhelmus H. J. M. Van Pelt; Jacobus P. Roodenrijs, both of 's-Hertogenbosch, Netherlands

[73] Assignee: Grasso's Koniklijke Machine Fabrieken, N.V., 's-Hertogenbosch, Netherlands

[21] Appl. No.: 399,867

[22] Filed: Jul. 19, 1982

Related U.S. Application Data

[62] Division of Ser. No. 202,429, Oct. 30, 1980, Pat. No. 4,316,368.

[51] Int. Cl.³ .............................................. B01D 9/04
[52] U.S. Cl. ......................................... 62/123; 62/542
[58] Field of Search .................................. 62/123, 542

[56] References Cited

U.S. PATENT DOCUMENTS

| | | | |
|---|---|---|---|
| 2,724,007 | 11/1955 | Tegge | 62/123 |
| 2,851,368 | 9/1958 | Findlay | 62/542 |
| 3,295,988 | 1/1967 | Malick et al. | 62/542 |
| 3,344,616 | 10/1967 | Owen | 62/123 |
| 3,400,548 | 9/1968 | Drayer | 62/123 |
| 3,561,225 | 2/1971 | Hinton | 62/542 |
| 3,620,034 | 11/1971 | Ganiaris | 62/541 |

*Primary Examiner*—Ronald C. Capossela
*Attorney, Agent, or Firm*—Cushman, Darby & Cushman

[57] ABSTRACT

A separator particularly useful in freeze concentration systems and apparatus, particularly multi-stage countercurrent systems for concentrating aqueous feed liquid, but useful for other kinds of separators as well. The slurry to be separated enters a vessel in which is mounted and rotated a cylindrical filter. The liquid passes through the filter to one outlet while the solids accumulate on the filter and are removed and directed to another outlet by a fixed scraper.

13 Claims, 8 Drawing Figures

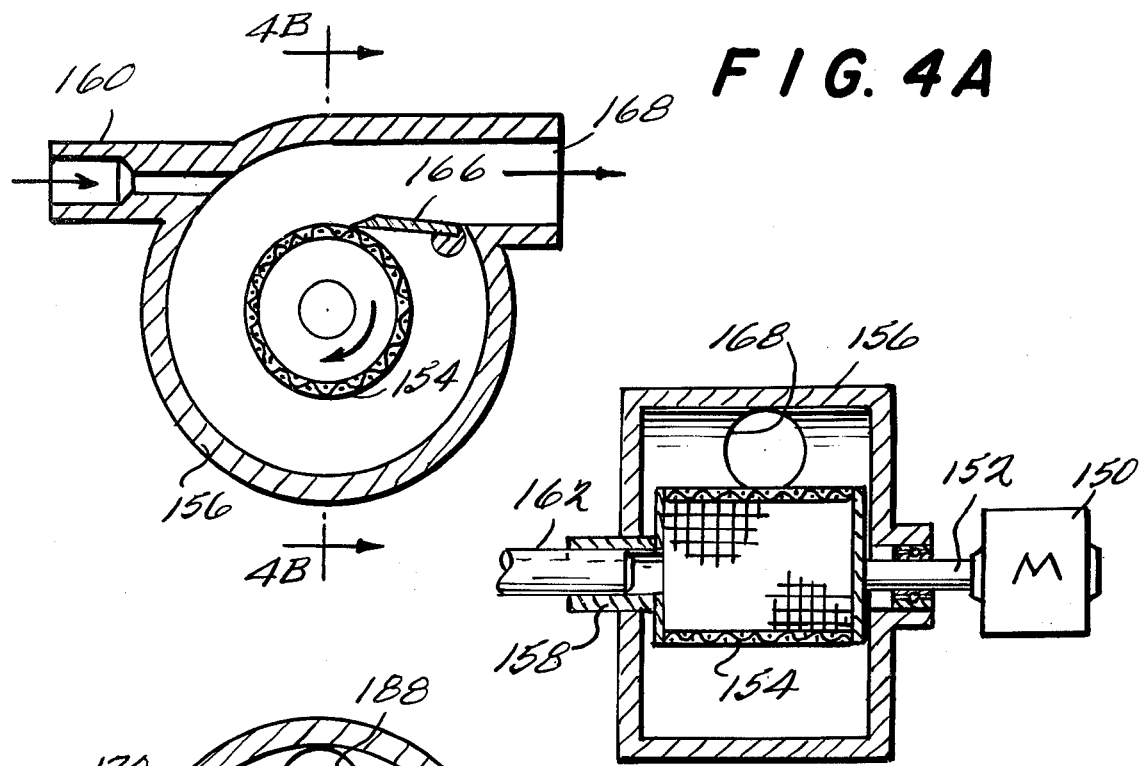
FIG. 4A
FIG. 4B
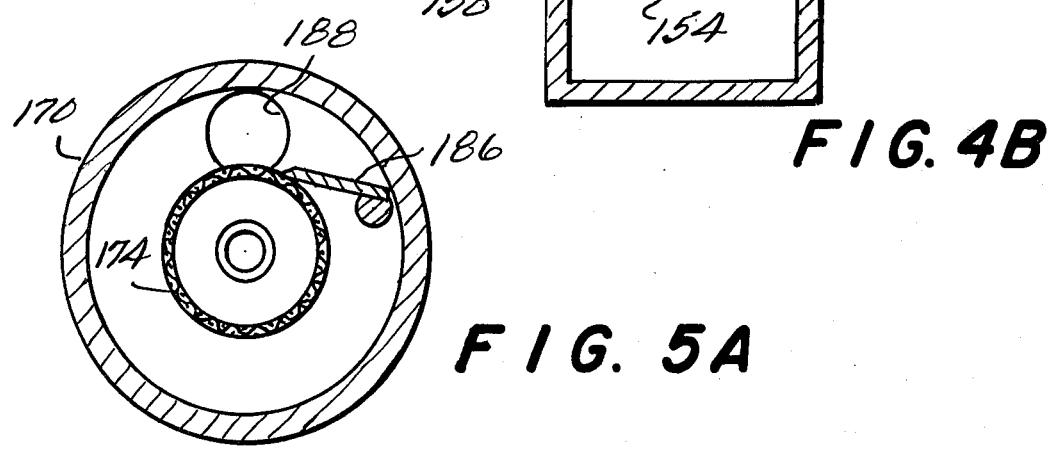
FIG. 5A
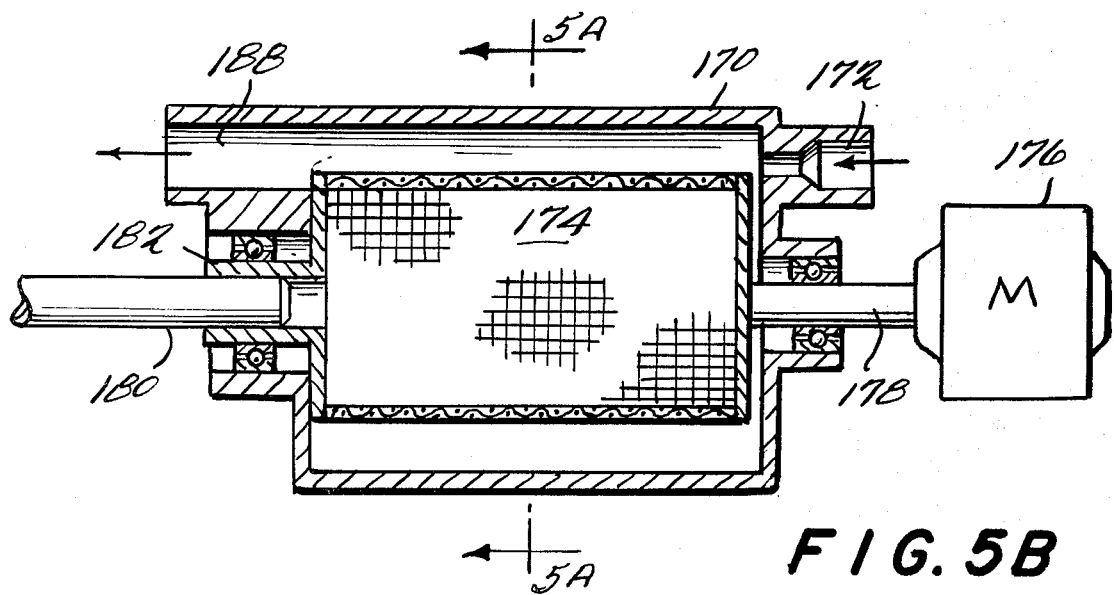
FIG. 5B

MULTI-STAGE COUNTERCURRENT CONCENTRATING SYSTEM AND METHOD AND SEPARATOR

This application is a division and continuation-in-part of Ser. No. 202,429 filed Oct. 30, 1980, now U.S. Pat. No. 4,316,368 and Ser. No. 349,819, filed Feb. 18, 1982.

BACKGROUND AND SUMMARY OF THE INVENTION

The invention relates to a system and method for concentrating an aqueous beverage and to a separator useful therein as well as apart therefrom.

Concentrating aqueous beverages for storage, transportation and sale has a number of substantial advantages and is being used more and more widely for an increasing variety of beverages. For some products, for example, coffee and tea, the purpose of concentration is to produce a product which is convenient for the consumer to use. For other products such as wine, milk, beer, vinegar and the like, the greatest advantage may lie in reducing the bulk of the material and thus reducing the expense of storage and transportation.

Concentration of such aqueous beverages can be done in one of three ways—evaporation, freeze concentration, or reverse osmosis. In evaporation techniques, the beverage is heated or steam is passed therethrough to remove the water by evaporation. In freeze concentration techniques, a slurry of ice is formed in the beverage and the ice is then separated from the resulting concentrated liquor. One of the drawbacks to evaporation techniques is that many of the subtle flavor components of aqueous beverages are volatile and escape during evaporation. This difficulty can in part be overcome by stripping many of those components before evaporation and then returning them to the concentrated beverage. However, some degradation in flavor seems to be inevitable with evaporation techniques. Reverse osmosis is non-selective and flavor components are lost making it unsatisfactory for concentration of aqueous beverages.

Freeze concentrated products do not suffer from degradation since retention of flavor components is almost one hundred percent. The main drawbacks in the past to freeze concentration processes have been expense and insufficient volume of operation.

The present invention relates to a process and system for freeze concentration which is more efficient than previous techniques and which can process large volumes of concentrated aqueous beverages in relatively short periods of time.

The patent to Thijssen et al U.S. Pat. No. 4,004,886 describes a process and apparatus for crystallization in which a slurry of seed ice crystals and mother liquor are produced in a scraped surface heat exchanger and continuously supplied to a recrystallization vessel in which the crystals grow. The mother liquor in the recrystallizer vessel is continuously mixed and recirculated to the scraped surface heat exchanger via a filter which prevents crystals from leaving the recrystallizer. Almost all of the crystals in the recrystallizer melt and reform on a few small seed crystals to produce a crystal slurry having relatively uniform sized crystals therein, which slurry is removed continuously from the recrystallizer as a crystal suspension. In this arrangement, the residence time in the system is substantially reduced because of the melting of the seed crystals supplied to the recrystallizer from the heat exchanger and reformation of these melted crystals onto the few large crystals which then grow as spheres. While others in the past have proposed systems using both scraped surface heat exchangers and larger tanks in which crystal growth takes place, for example, the patent to Walker U.S. Pat. No. 3,156,571, it is the melting of the vast majority of the ice crystals and the recirculation only of liquid from the recrystallizer which reduces the residence time and produces the uniform crystal size in both the system described in the Thijssen et al patent, and the present invention. The uniform crystal size in particular permits use of wash columns in the system instead of centrifuge or other separating devices which have technical and other disadvantages.

The slurry which is removed from the recrystallizer in the above-described system of the Thijssen et al patent is preferably supplied to a wash column, for example, as described in the Thijssen U.S. Pat. No. 3,872,009. In this particular wash column, the slurry is supplied to the bottom of a column and then compacted against the ice mass by a piston which periodically pushes the mass upward. The ice at the top of the column is chopped and removed from the column where it is melted and at least in part returned to the column to flow downward to maintain a washfront when the piston applies pressure to the bottom of the column. The mother liquor is removed as concentrated liquor through perforations in the piston.

In a system as described in our U.S. Pat. No. 4,316,368, a plurality of concentrating units are connected together for counter-current operation. Countercurrent freeze concentration as such is not new. For example, Ganiaris U.S. Pat. No. 3,283,522 describes a multi-stage freeze concentrating system in which ice passes toward the first stage and mother liquor toward the last stage. However, in the system of our patent, only the crystals from the succeeding stage grow; in all stages except the last, practically all seed crystals (of the order of 99% and at least more than 90%) formed in that stage melt and reform on the larger crystals from the succeeding stages and this remarkably improves the efficiency of concentration. Further, the separation is done in the lowest concentration step where viscosity is lowest and the wash column performs most efficiently.

In the first stage which receives the feed liquid to be concentrated and produces a first intermediate concentrated solution, a slurry of ice crystals and liquid in a recrystallization vessel are supplied to a separator such as a wash column and the intermediate concentrated solution is passed to a second stage. The ice crystals from the second stage are separated from at least part of the slurry liquid and passed countercurrent to the direction of movement of the aqueous beverage liquid and to the recrystallization vessel of the first stage. Almost all of the seed crystals produced in the first stage, for example, by a scraped surface heat exchanger, then melt and reform upon the larger crystals supplied from the second stage. Third and additional stages can also be provided, each passing at least the ice back directly to the recrystallization vessel of the preceding stage so that the crystalline growth takes place only on the crystals which are supplied from the succeeding stage and practically all of the crystals generated in each stage except the last melt and reform thereon.

By utilizing this countercurrent approach, three stages which each can remove 250 kilograms of ice per hour from a liquid feed will remove at least 1800 kilograms per hour in a countercurrent configuration, as opposed to 750 kilograms per hour in parallel operation and 1200 kilograms per hour in serial operation in which only the liquid is passed through succeeding stages.

The water removal capacity in kilograms of ice per hour of any freeze concentration system depends on the viscosity of a given product concentration and the diameter of the ice crystals at that concentration. The viscosity of any liquid is strongly dependent upon its concentration. The crystal growth velocity is dependent also upon concentration so that an increase in concentration results in a sharp decrease of the crystal growth velocity and an increase in viscosity, both of which substantially reduce the rate of crystal growth. Using the countercurrent approach, crystal growth can take place on crystals which have already grown large and can take place in a less concentrated solution, both factors decreasing residence time and hence increasing capacity. Separation in the lowest concentration stage is also most efficient.

Efficient separation of solids from liquids in a slurry or the like is, in general, difficult, particularly in the system of our previous patent. The apertures through which liquid must pass are subject to clogging and often such devices are subject to frequent breakdowns. Viscous slurries are particularly difficult to separate.

The present invention utilizes structure which is mechanically simple and reliable, which operates under a variety of conditions, which handles viscous slurries and which finds particular utility in the system described in our previous patent. The separator includes a vessel having an interior space, an inlet into that space through which the slurry to be separated enters the vessel, a first outlet for the solids, and a second outlet for at least some of the slurry liquid. A cylindrical filter is rotatably mounted within the vessel in the space between the inlet and second outlet so that liquid flows through the filter to the second outlet while the solids accumulate thereon. The solids are scraped off the filter and pass out the first outlet. In one embodiment the solids are slurried with liquid injected from a second inlet whereas in a second embodiment a part of the feed liquid slurries the solids.

The first inlet in the second embodiment, and the only inlet in the first embodiment, can be positioned so that the slurry enters the vessel parallel to the axis of rotation of the filter and the liquid exits parallel thereto or so that the slurry enters perpendicular thereto and the liquid exits through an outlet positioned opposite the inlet.

This unique separator is particularly efficient in separating the crystals from most of the liquid and for returning the crystals to the preceding stage as described in our patent. However, the separator can also be used to improve the efficiency of other parts of the system of our earlier patent.

First, the end concentration is limited by the maximum viscosity at freezing point which can be handled by the filter of the recrystallizing vessel. The separator described above can separate effectively at high viscosity. Therefore, final product concentration can be increased by adding a scraped surface heat exchanger and separator to the final stage where the product liquid is removed. The heat exchanger can replace one of the other heat exchangers of the system. The filtered liquid removed from the final stage recrystallizer which hitherto was the final product is instead supplied to the scraped surface heat exchanger where a part of the water is frozen to tiny ice crystals and the viscosity increased. The slurry is injected into the separator where a part of the liquid is withdrawn as product flow. The slurry with the increased ice content is then fed back to the final stage recrystallizer.

Second, the separator can be effectively used to filter the flow from the recrystallizer to the scraped surface heat exchangers. The separator can be mounted internal to the recrystallizer vessel and the filter rotated by the stirrer motor. In bigger recrystallizer vessels the shaft for the filter may have to be too long to be so driven. In this case separate driven internal filters can be applied. If the desired filter surface cannot be built in the recrystallizer vessel, the separator can be external to the recrystallizer vessel. This has the additional advantage that one separator can be provided for each scraped surface heat exchanger.

Other purposes and objects of the invention will be clear from the following detailed description of the drawings.

BRIEF DESCRIPTION OF THE DRAWINGS

FIGS. 4A and 4B show a further separator according to the present invention;

FIGS. 5A and 5B show a third separator according to the present invention;

DETAILED DESCRIPTION OF THE DRAWINGS

Figure 1:
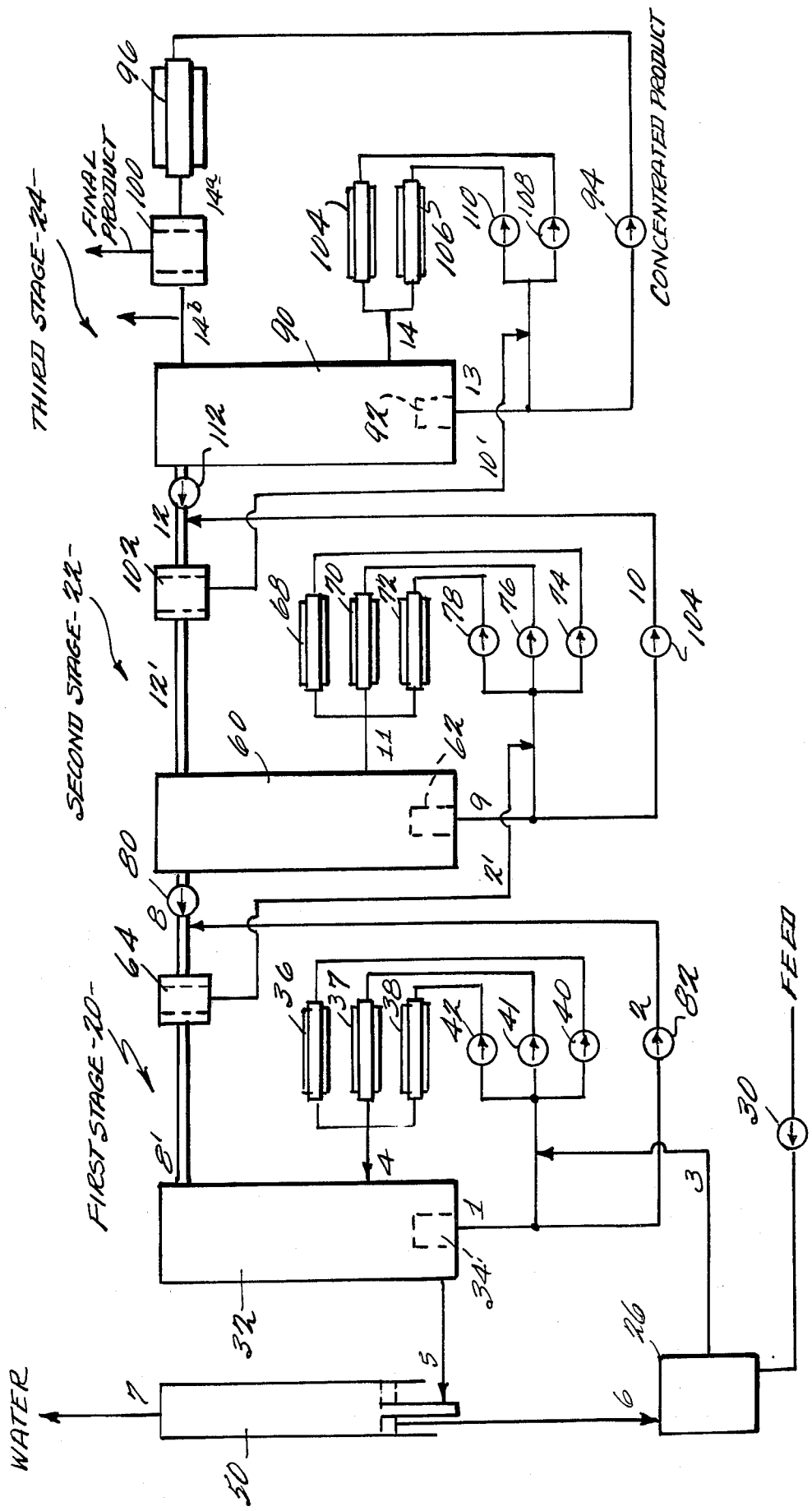
FIG. 1 shows a flow diagram of a countercurrent concentrating system.

Reference is now made to FIG. 1 which illustrates in schematic form a countercurrent crystallization system comprising three concentrating stages generally indicated as 20, 22 and 24. It will be understood that the present invention can be utilized with as few as two stages and as many as are necessary and appropriate to achieve desired concentration. An aqueous beverage liquid to be concentrated is supplied to a retaining tank 26 of stage 20 continuously or periodically. Feed liquid to tank 26 is supplied by pump 30. A portion of the liquid in recrystallizing vessel 32 is removed via filter 34 as described in the above-mentioned Thijssen U.S. Pat. No. 4,004,886, the disclosure of which is hereby incorporated by reference.

A part of the liquid removed from vessel 32 as a first intermediate concentrated liquid and the feed liquor from tank 26 are mixed and supplied to three parallel connected conventional scraped surface heat exchangers 36, 37 and 38 by pumps 40, 41 and 42. It is preferred to use two or three scraped surface heat exchangers in parallel in each stage rather than a large one so that if one should malfunction, the system can still continue in operation.

As described in the above-mentioned Thijssen U.S. Pat. No. 4,044,886, the slurry of seed crystals and liquid formed as output of the scraped surface heat exchangers is supplied to vessel 32. These seed crystals preferably have an effective diameter less than 5–10 microns. The seed crystals practically all melt within vessel 32 and reform on larger crystals from the succeeding stage supplied as described below. The slurry of larger ice crystals and liquid in vessel 32 is removed therefrom and the ice separated from the mother liquor in wash column 50 as described in the above-mentioned patent to Thijssen U.S. Pat. No. 3,872,009, the disclosure of which is also hereby incorporated by reference. The melted ice is removed by wash column 50 from the system as water and discarded. The concentrated output of wash column 50 is supplied to feed tank 26 and hence to the scraped surface heat exchangers as described above.

A portion of the liquid in recrystallizing vessel 60 of second stage 22 is similarly removed via filter 62 as described in the above-mentioned Thijssen patent. A part of the liquid removed from vessel 60 as a second intermediate concentrated liquid and the liquid from separator 64 is mixed and supplied to parallel connected conventional scraped surface heat exchangers 68, 70 and 72 by pumps 74, and 76 and 78. As noted above, it is preferred to use two or more scraped surface heat exchangers in parallel in each stage rather than a large one, so that if one should malfunction, the system can still continue in operation. As described in the above mentioned Thijssen U.S. Pat. No. 4,044,886 the slurry of seed crystals and liquid formed as output of the second stage scraped surface heat exchangers is supplied to vessel 60. These seed crystals preferably have an effective diameter less than 5–10 microns. The seed crystals practically all melt within vessel 60 and reform on larger crystals from the succeeding third stage supplied as described below.

The slurry of ice crystals and liquid in recrystallizer 60 is removed therefrom by pump 80. The slurried ice crystals are fed to recrystallization vessel 32 where the relatively large ice crystals (compared to the crystals supplied by heat exchangers 36, 37 and 38) grow as the seed crystals from heat exchangers 36, 37 and 38 melt and reform on the larger crystals from stage 22. Part of the liquid from vessel 32 is pumped by pump 82 and mixed with the slurry from vessel 60. The liquid separated by separator 64 is mixed with part of the liquid from vessel 60 and pumped to the heat exchangers of second stage 22.

Referring to third stage 24, a portion of the liquid in recrystallization vessel 90 is removed via filter 92 as described in the above-mentioned Thijssen patent. A part of the liquid removed from vessel 90 as a concentrated liquid and the other part of the second intermediate concentrated liquid removed from vessel 62 and supplied to separator 102 is mixed and supplied to two parallel connected conventional scraped surface heat exchangers 104 and 106 by pumps 108 and 110. The slurry in vessel 90 is pumped by pump 112 to separator 102 which operates in the same fashion as separator 64.

As noted above, it is preferred to use two scraped surface heat exchangers in parallel in each stage rather than a large one, so that if one should malfunction, the system can still continue in operation. As described in the above-mentioned Thijssen U.S. Pat. No. 4,044,886 the slurry of seed crystals and liquid formed as output of the scraped surface heat exchangers is supplied to vessel 90. As in the other stages, these seed crystals preferably have an effective diameter less than 5–10 microns. Most of the seed crystals supplied by heat exchangers 104 and 106 melt in recrystallizing vessel 90 and reform on those few crystals which do not melt.

As described in the summary above, part of the concentrated liquid from vessel 90 is pumped by pump 94 to an additional scraped surface heat exchanger 96 where the viscous liquid forms further crystals. The resulting slurry passes to another separator 100 of the type shown in FIG. 3 to produce a final concentrated liquid and a slurry which passes into vessel 90.

The following Table indicates the amounts of liquid and ice at points in the system corresponding to the numbers in FIG. 1.

TABLE

| | Amount of Liquid (kg/h) | Concentration (wt %) | Amount of Ice (kg/h) |
|---|---|---|---|
| 1 | 9,275 | 27.9 | — |
| 2 | 5,241 | 27.9 | — |
| 2' | 5,241 | 32.0 | — |
| 3 | 7,747 | 23.6 | — |
| 4 | 10,906 | 27.1 | 875 |
| 5 | 4,706 | 27.9 | 2,017 |
| 6 | 4,706 | 27.9 | — |
| 7 | 2,017 | 0.0 | — |
| 8 | 2,952 | 39.3 | 1,265 |
| 8' | 2,952 | 32.0 | 1,265 |
| 9 | 9,383 | 39.3 | — |
| 10 | 2,224 | 39.3 | — |
| 10' | 2,224 | 42.4 | — |
| 11 | 11,357 | 39.5 | 1,043 |
| 12 | 840 | 50.6 | 360 |
| 12' | 840 | 42.4 | 360 |
| 13 | 7,515 | 50.6 | — |
| 13a | 1,024 | 50.6 | — |
| 14 | 8,177 | 51.7 | 538 |
| 14a | 797 | 65.0 | 227 |
| 14b | 340 | 65.0 | 227 |
| Feed | 2,474 | 12.0 | — |
| Product | 457 | 65.0 | — |
| Water | 2,017 | 0.0 | — |
| A comparable system without heat exchanger 96 and separator 100 produced the following: | | | |
| Feed | 2,088 | 12.0 | |
| Product | 507 | 49.4 | |
| Water | 1,581 | 0.0 | |

The outlets of at least some scraped surface heat exchangers can be directly injected into the filter supplying crystals to that stage. This reduces the number of pumps and also the amount of liquid which passes through the filters. The result is that the product concentration difference between the stages increases while a higher concentration is injected.

Another possibility is to inject the output of a scraped surface heat exchanger of a previous stage (for example, first and second in a four stage system) directly into the recrystallizer of the succeeding stage. Because the concentration difference between the last and penultimate stages is great, product concentration is acceptable and the system is considerably simplified.

Figure 2:
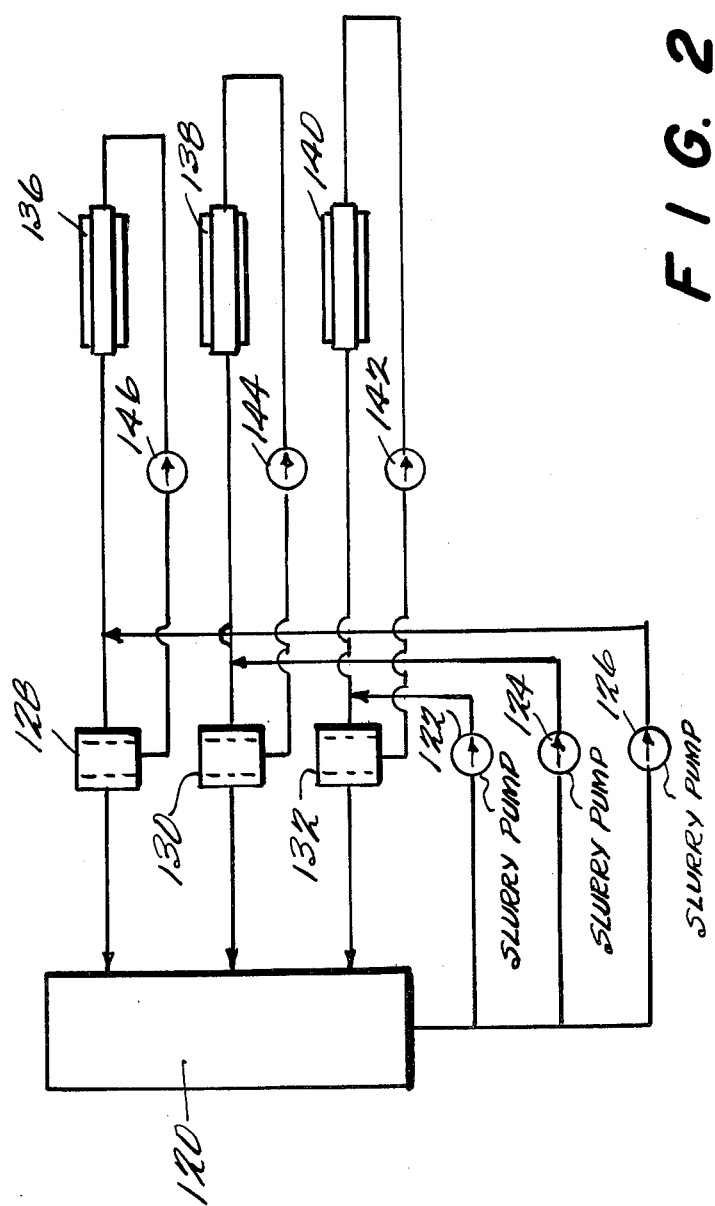
FIG. 2 shows a modification of the system of FIG. 1.

Reference is now made to FIG. 2 which shows part of one of the stages of a system such as shown in FIG. 1. As mentioned above, the unique separator described below can also be used to filter the output of the recrystallizing vessel in one or more of the stages of a multistage counter-current system. In FIG. 2, slurry in recrystallizing vessel 120 is supplied by pumps 122, 124 and 126 to separators 128, 130, and 132 together with the slurry produced by scraped surface heat exchangers 136, 138 and 140. The separators in the arrangement of FIG. 2 are external to the vessel and may be of the type shown in FIGS. 3, 4 and 5. Providing separators external to the vessel permits one separator to be provided for each of the separate heat exchangers, thus providing greater flexibility in the system. The concentrated slurry from the respective separators is returned to vessel 120 and the liquid pumped to the respective heat exchangers by pumps 142, 144 and 146, respectively.

FIGS. 4 and 5 show arrangements of this sort. Referring first to FIG. 4, motor 150 drives shaft 152 which rotates cylindrical filter 154 within the separator vessel 156. Separator vessel 156 in turn is mounted within the recrystallization vessel. Further, shaft 158 is coupled to filter 154 to drive the stirrer within the recirculating vessel. Cylindrical filter 154 may simply be a screen of whatever fineness is desired to retain ice crystals of a given size. The filter need not be cylindrical; a flat fixed filter and a rotating scraper can be used. As can be best seen in FIG. 4A, the slurry to be separated, (with respect to separator 64 in FIG. 1, the liquid from vessel 32 mixed with the slurry from vessel 60) is injected at inlet 160 into the interior of vessel 156 in a direction substantially perpendicular to the axis of rotation of cylindrical filter 154. Most of the liquid within the slurry passes through the apertures in the cylindrical filter 154 and leaves vessel 156 at outlet 162. With respect to separator 64, this outlet is connected to pumps 78, 76 and 74 for supplying the liquid to the heat exchangers of second stage 22. The ice accumulates on the rotating outer surface of cylindrical filter 154 and is scraped therefrom by a metal or other scraping blade 166 which contacts the outer surface of the rotating filter 154 adjacent outlet 168. The ice thus removed is slurried with some of the liquid supplied at inlet 160 to form a slurry more concentrated than the slurry received which leaves outlet 168. With respect to separator 64, this slurry is then supplied to recrystallizing vessel 32.

The slurry to be separated can be injected in a direction substantially perpendicular to the axis of rotation or in a direction substantially parallel thereto. FIGS. 5A and 5B show the latter arrangement in which the slurry enters vessel 170 at an inlet 172 and in a direction substantially parallel to the axis of rotation of cylindrical filter 174. In this embodiment, cylinder 174 is driven by motor 176 through shaft 178 and is coupled to a further shaft 180 to drive a helical stirrer in the recirculation vessel. As in the embodiment of FIG. 4, the separator of FIG. 5 is intended to be mounted in the recirculating vessel. Most of the liquid passes through the apertures in cylindrical filter 174 and leaves at outlet 182. The ice crystals are scraped from the surface of the rotating filter 174 by scraper 186 and the resultant slurry leaves at outlet 188.

Figure 3:
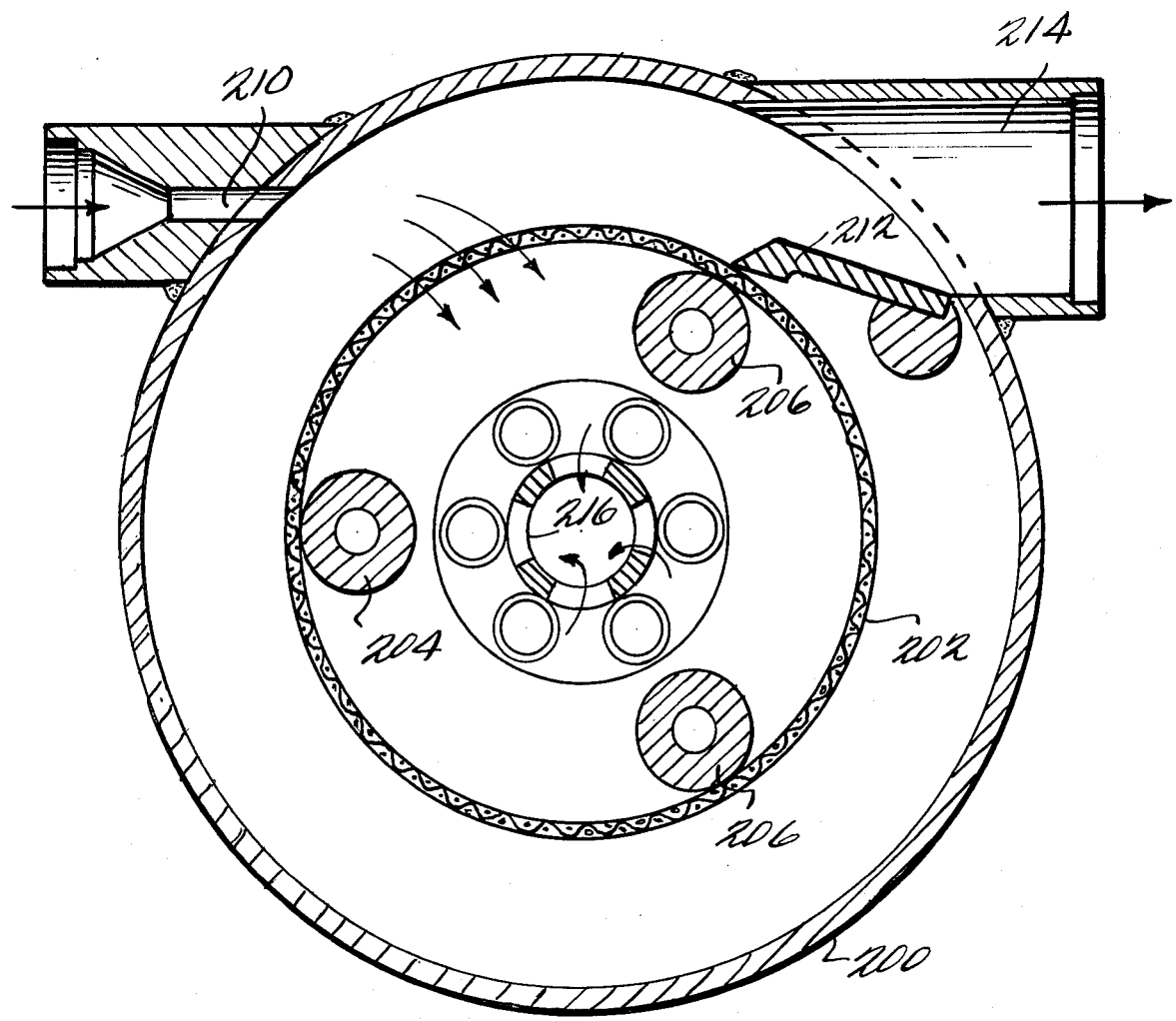
FIG. 3 shows a sectional view of a separator according to the present invention.

Under those circumstances, a separator such as shown in FIG. 3 or some modification thereof can be used. Mounted within the interior space of vessel 200 in FIG. 3 is a cylindrical filter 202 having apertures therethrough of any desired size. Vessel 200 is of generally cylindrical shape. Filter 202 is mounted for rotation by a suitable motor, for example as shown in FIGS. 4 and 5, and supported during rotation by rollers 204, 206 and 208. The slurry to be separated is injected at inlet 210 as described above, in a direction substantially perpendicular to the axis of rotation of cylindrical filter 202. Most of the liquid so injected passes through the apertures in filter 202, while the solid ice crystals accumulate on the outer surface thereof, and are removed by scraper 212. Some of the liquid injected remains to slurry the ice which then leaves at outlet 214. The liquid passes through central apertures 216 to leave at a second outlet as discussed above.

Figure 6:
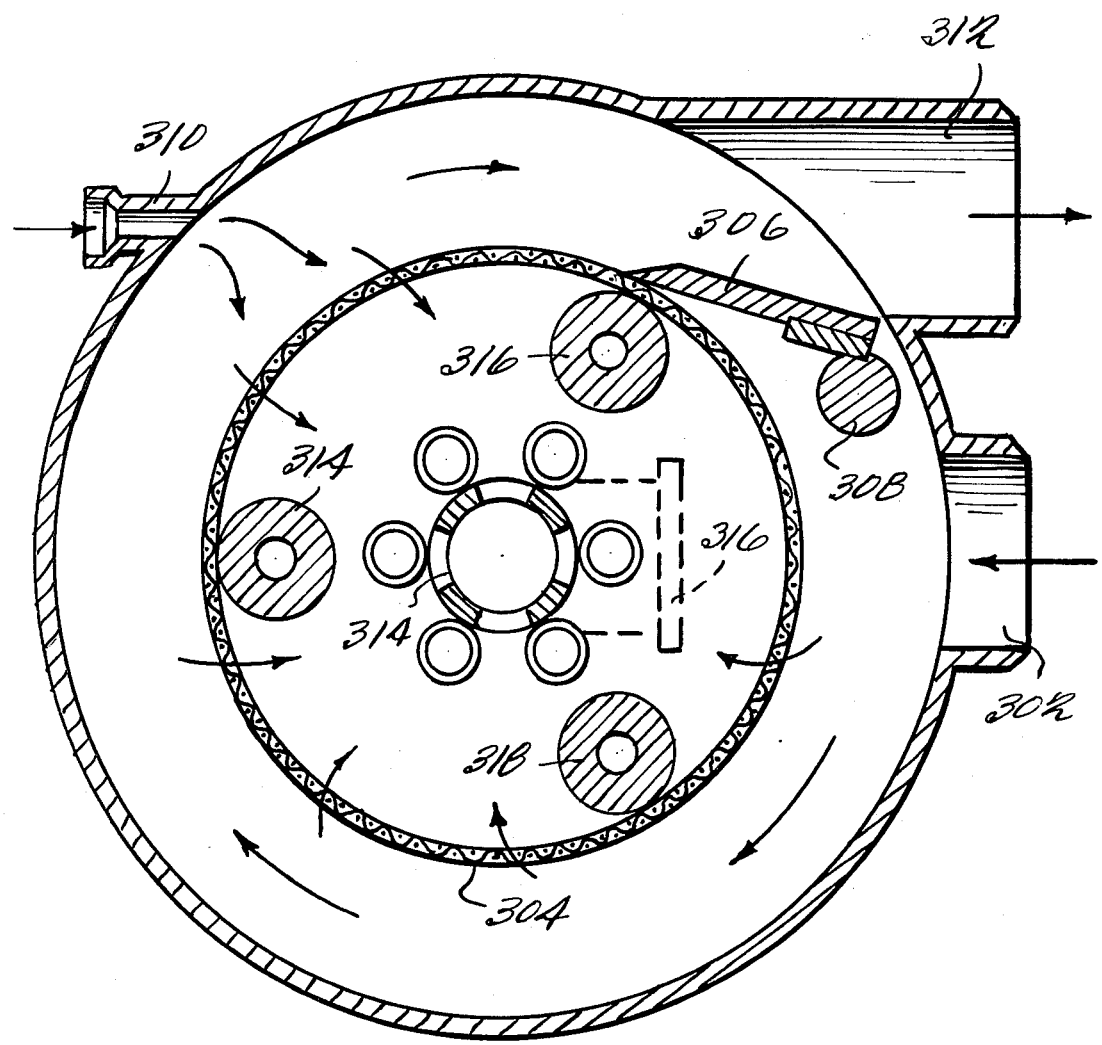
FIG. 6 shows another separator according to the present invention.

FIG. 6 shows another separator according to this invention. In this separator, the slurry is supplied to a generally cylindrical tank 300 at inlet 302 and the liquid is withdrawn by a positive displacement pump through filter 304 which is of the type described above. Filter 304 is continually rotated by a motor (not shown) and the ice which cakes on the outside of filter 304 is scraped from the exterior surface of filter 304 by a blade 306 mounted on member 308. Rollers 314, 316 and 318 support filter 304 during rotation. Low concentrated liquid is blown by a positive displacement pump into the unit tangentially to the axis of rotation at inlet 310 to cause the ice to be slurried and passed as a slurry from outlet 312 to the preceding stage. The low concentrate also penetrates to some extent through the filter and mixes with the higher concentrated solution so that the separator can function not only to move ice or other solids, but also to move the liquid in the opposite direction toward another stage for further concentration in a countercurrent system. The mixed low concentrate and high concentrate liquid pass through apertures in the central cylinder 314 and are removed at outlet 316.

Many changes and modifications can, of course, be carried out without departing from the scope of the present invention, that scope being intended to be limited only by the scope of the appended claims.

What is claimed is:

1. Apparatus for separating solids and liquids in a slurry comprising:
   a vessel having a first inlet, a first outlet opposite said first inlet for solids which are separated and a second outlet for liquid which is separated;
   a filter mounted in said vessel;
   means for supplying from said first inlet at least liquid in a direction to contact said filter in a plane substantially tangential to the surface of said filter to pass along said surface and supplying said slurry to the filter so that at least a portion of said liquid passes therethrough to said second outlet and said solid accumulates on the surface of said filter; and
   means for continuously removing said solids from said filter surface adjacent said first outlet so that a portion of said liquid from said first inlet transports the removed solids to said first outlet.

2. A multiple-stage countercurrent system for concentrating an aqueous feed liquid to produce a final concentrated product comprising:
   a first concentrating stage for receiving said feed liquid and producing an intermediate concentrated liquid including first seed crystal forming means for receiving feed liquid and forming a slurry of seed ice crystals and feed liquid, first recrystallizing means for receiving said slurry from said first seed crystal forming means and producing a first slurry containing larger crystals, first means for separating a portion of the liquid from crystals from said first recrystallizing means and supplying at least part of said portion to said first seed crystal forming means, and first means for removing said slurry from said first recrystallizing means and separating the larger crystals removed from said recrystallizing means;
   at least a second and final concentrating stage for receiving said intermediate liquid and producing said final concentrated product liquid including second seed crystal forming means for receiving said intermediate liquid and forming a slurry of seed ice crystals and intermediate liquid, second recrystallizing means for receiving said slurry from said second seed crystal forming means and producing a second slurry containing larger crystals, second means for separating a portion of the liquid from crystals from said second recrystallizing means and supplying at least part of said portion to said second seed crystal forming means, and means for removing a portion of said second slurry from said second recrystallizing means as a first concentrated product liquid;

said second and final stage further including an additional crystal forming means for receiving said first concentrated product liquid and forming a further slurry of liquid and ice crystals therein and means for separating said further crystals from said liquid to produce said final concentrated product including at least one heat exchanger means, a separating vessel having an interior space, a first inlet into said space for receiving said slurry, a first outlet out of said space for separated solids and a second outlet out of said space for separated liquid, a cylindrical filter mounted for rotation in said space between said inlet and second outlet so that said liquid passes therethrough to said second outlet and said solids accumulate on the surface of said filter, scraping means mounted adjacent said filter in contact with said filter surface for removing solids from said surface as said filter is rotated so that said solids pass out said first outlet; and means for supplying at least said larger crystals removed from said second recrystallizing means to said first recrystallizing means so that at least substantially all of the seed crystals in said first recrystallizing means melt and reform on said larger crystals from said second recrystallizing means.

3. Apparatus for at least partially separating solids and liquid in a slurry comprising:

a separating vessel having an interior space, a first inlet into said space, a first outlet out of said space for separated solids opposite said first inlet and a second outlet out of said space for separated liquid;

a cylindrical filter mounted for rotation in said space between said first inlet and second outlet so that said liquid passes therethrough to said second outlet and said solids accumulate on the surface of said filter; and scraping means mounted adjacent said filter and said first outlet in contact with said filter surface for removing solids from said surface as said filter is rotated so that said solids are slurried with liquid from said first inlet and pass out said first outlet.

4. An apparatus for forming a slurry of feed liquid and crystals comprising:

at least one heat exchanger means for forming a slurry of seed crystals and feed liquid;

a recrystallizing vessel for receiving the slurry from said heat exchanger means so that larger crystals are grown therein; and at least one separating means, connected to said heat exchanger means and to said vessel for receiving the slurry from said vessel, and supplying at least some of the liquid therein to said heat exchanger means including a separating vessel having an interior space, a first inlet into said space for receiving said slurry, a first outlet out of said space for separated solids which are returned to said vessel, and a second outlet connected to said heat exchanger means for supplying some of the separated liquid to said heat exchanger means, a cylindrical filter mounted for rotation in said space between said inlet and second outlet so that said liquid passes therethrough to said second outlet and said solids accumulate on the surface of said filter, and scraping means mounted adjacent said filter in contact with said filter surface for removing solids from said surface as said filter is rotated so that said solids pass out said first outlet.

5. Apparatus as in claim 2, 3, or 4, wherein said separating means is exterior to said recrystallizing vessel.

6. Apparatus as in claim 2, 3, or 4 including a plurality of heat exchanger means and a plurality of separator means each connected to one of said heat exchanger means and to said recrystallizing vessel.

7. Apparatus as in claim 2, 3, or 4 wherein said separating means is mounted within said recrystallizing vessel.

8. Apparatus as in claim 2, 3, or 4, wherein said recrystallizing vessel includes means for stirring the contents thereof, a motor for driving said stirring means and wherein said filter is mounted for rotation by said motor.

9. Apparatus as in claim 2, 3, or 4, wherein said first inlet is positioned to supply said slurry to said interior space substantially parallel to the axis of said filter at one end thereof and said second outlet is positioned within said filter at the other end thereof so that said liquid flows through said second outlet substantially parallel to said axis.

10. Apparatus as in claim 2, 3, or 4, wherein said first inlet is positioned to supply said slurry to said interior space in a direction substantially perpendicular to the axis of said filter from one side thereof.

11. Apparatus as in claim 2, 3 or 4, wherein said vessel includes a second inlet into said space for receiving said slurry.

12. An apparatus for forming a slurry of feed liquid and crystals comprising:

at least one heat exchanger means for forming a slurry of seed crystals and feed liquid;

a recrystallizing vessel for receiving the slurry from said heat exchanger means so that said seed crystals form a slurry of larger crystals;

means for separating liquid in said slurry of larger crystals from the larger crystals therein including a cylindrical filter having an outlet therein for liquid to be recirculated to said heat exchanger, said liquid passing through said filter so that crystals accumulate on the surface of said filter, and a scraper for removing crystals from the surface of said filter; and means for supplying said slurry from said heat exchanger so that said slurry impinges onto said filter in a direction to contact said filter in a substantially tangential plane to the surface thereof so that a portion of said liquid supplied transports the removed crystals.

13. Apparatus as in claim 12, including a plurality of heat exchangers and a plurality of separating and supplying means, each associated with one of said heat exchangers.

* * * * *